United States Patent [19]

Schooley

[11] Patent Number: 5,555,077
[45] Date of Patent: Sep. 10, 1996

[54] PRINTER HAVING AN ACTIVE USER INTERFACE FEATURE

[75] Inventor: Richard M. Schooley, Rochester, N.Y.

[73] Assignee: Xerox Corporation, Stamford, Conn.

[21] Appl. No.: 347,940

[22] Filed: Dec. 1, 1994

[51] Int. Cl.$^6$ ..................................................... G03G 15/00
[52] U.S. Cl. ......................... 355/209; 355/202; 355/204
[58] Field of Search ........................ 355/209, 55, 60–61, 355/202–204; 382/1, 61; 395/111, 117; 340/500, 525, 825, 825.06, 825.15, 825.17, 825.36; 364/188, 189

[56] References Cited

U.S. PATENT DOCUMENTS

| | | |
|---|---|---|
| 4,017,173 | 4/1977 | Komori et al. . |
| 4,475,806 | 10/1984 | Daughton et al. . |
| 4,707,110 | 11/1987 | Harada et al. .................. 355/326 R |
| 4,716,439 | 12/1987 | Acquaviva . |
| 4,799,083 | 1/1989 | Knodt ................................. 355/209 |
| 4,866,486 | 9/1989 | Higashio et al. ............... 355/326 R |
| 5,049,931 | 9/1991 | Knodt ................................. 355/209 |
| 5,105,220 | 4/1992 | Knodt et al. ....................... 355/209 |
| 5,119,206 | 6/1992 | Rourke et al. ..................... 358/296 |
| 5,177,617 | 1/1993 | Tuhro ................................. 358/296 |
| 5,212,568 | 5/1993 | Graves et al. ..................... 358/474 |
| 5,398,289 | 3/1995 | Rourke et al. ......................... 382/1 |

OTHER PUBLICATIONS

S. Strella, "Method For Copying 11 I B 17 I Original Documents", *Xerox Disclosure Journal*, vol. 8, No. 2, Mar./Apr. 1983, p. 121.

*Primary Examiner*—Thu Anh Dang
*Attorney, Agent, or Firm*—Tallam I. Nguti

[57] ABSTRACT

A printer including a controller for controlling reproduction functions of the machine, and a user active interface. The active interface includes user actuatable control for selecting one of at least two modes of the printer for performing a desired reproduction function, and a start control for starting the printer to perform the desired function according to the selected one of the at least two modes thereof. The active interface also includes a graphic display representing each of the at least two modes for performing the desired reproduction function, and a connection to the controller for animating the graphic display in response to a user actuating an actuatable control for selecting one of the at least two modes for performing the desired function.

24 Claims, 4 Drawing Sheets

PRINTER HAVING AN ACTIVE USER INTERFACE FEATURE

BACKGROUND OF THE INVENTION

The present invention relates to xerographic reproduction machines and more specifically to such a machine having a user active interface feature for communicating with a user during a reproduction function that involves a long and variable user activity.

As the art of xerographic copying has matured, the design of xerographic reproduction machines or printers has also matured. Xerographic copiers and printers which include programmable controllers are now capable of making copies from sheet originals, from book pages and forms, and of stapling a desired number of such copies into sets for stacking in an output tray. Different copying options are available on various versions of a basic machine so that while one version may have a recirculating document handler for automatically moving sheet original documents over a platen, another may only have a platen and platen cover requiring the user to manually insert a document such as a book thereonto for copying.

In addition to the copying options, certain convenience and quality control features are also available on such machines for making it easier for a user to interact with the machine when producing desired copies. Automatic billing equipment, for example, automatically informs the user of what client the particular job being run on the copier is performed for, and also how many copies that particular job entails. Other convenience features added to the xerographic copier allow the user to more efficiently and intelligently interact with the copier. Human Factors Engineering has made it easier for an uninitiated operator to learn how the copier operates and how to diagnose and correct faults when they occur in the copier operation.

For such interaction, alphanumeric displays have been used to both prompt and alert the user of copier status as well as of faults. Statements such as "Standby," "Please Wait," "Ready," "Insert Documents," and "Select Number of Copies," have been used to alert the user to the status and operation of the copier. Similar display units have generated alphanumeric error codes which refer the user to a flip chart giving instructions on how to correct various problems and/or faults encountered during copier operation.

Although not commercially exploited to the extent of alphanumeric displays, graphic displays have also been suggested and used as ways to further educate the copier user regarding the status of the copier. As disclosed, for example, in U.S. Pat. No. 4,475,806 issued Oct. 9, 1984, to Daughton et al., these graphic displays or icons graphically illustrate a copier configuration and can involve the use of selectively energizable elements to cue the user as to what portion of the copier needs attention and/or maintenance. Thus, in a copier incorporating a recirculating document handler, a flashing icon of such a document handler positioned in relation to the rest of the copier may indicate to the user a jam in the paper circulating in the document handler. This type of queuing can be particularly effective when coupled with an alphanumeric message reenforcing the user's perception that he has been educated as to the source of his problem.

Of the various functions performed by such reproduction machines, book copying is one of the more complex and problematic. As disclosed, for example, in U.S. Pat. No. 5,177,617 and U.S. Pat. No. 5,212,568, book copying ordinarily involves mode selection, and problematic variable activities such as and reregistration on the platen, of a book being copied.

Acquaviva, U.S. Pat. No. 4,716,439 issued Dec. 29, 1987, discloses a printing machine in which two original documents supported on a platen are flash illuminated to record latent images thereof on a charged photoconductive surface. To record reproduce as two separate copies a latent image of one document is erased after a first flash illumination in order to record only that of the other document, and after a second flash illumination, the latent image of the other document is erased in order to record only that of the one document.

In Komari et al. U.S. Pat. No. 4,017,173 issued Apr. 12, 1977, an open book is positioned on the platen of the copying machine. The optical system is a scanning system wherein the light source, lens and mirrors move across the platen to illuminate successive incrementals of the document positioned on the platen. A control system controls the movement of the optical system such that it moves across one-half of the book to record an electrostatic latent image on the photoconductive surface corresponding to one page thereof. Thereafter, the optical system moves across the other half of the book to record an electrostatic latent image corresponding to the other page of the book on the photoconductive surface. These electrostatic latent images are developed and transferred to different copy sheet surfaces. The copy sheet surfaces may be on opposite sides of the same copy sheet or on different copy sheets.

Xerox Disclosure Journal, Vol. 8, No. 2, March/April 1983, page 121, discloses an electrostatographic printing machine using a flash illumination system. A control system regulates the flash illumination system such that a document being advanced across the platen by a document handling unit is flash exposed once when the first half of the original document is positioned on the platen and flash exposed a second time when the second half of the original document is located on the platen.

Book copying methods and apparatus in a copying machine, suitable for copying sheet documents of various sizes, normally provide for varying the positioning and registration of the book on a platen magnification of the book image in order to prevent the production of book page copies with darkened edges. Reselection of the bookcopying mode from one to two-sided copying or vice versa ordinarily also requires repositioning and registration of an open book being copied. In addition, because a job of copying a book can take a long period of time, in addition to involving both modes of copying pages thereof, an operator is likely to forget a selected mode, and as a result fail to produce desired copies, or undesirably produce unwanted copies.

There is therefore a need to provide in a reproduction machine a user active interface feature including animated marking and communication means for guiding and directing an operator through a book copying function so as to minimize confusion and errors that ordinarily would resort from such a long function that involves variable user activities.

SUMMARY OF THE INVENTION

In accordance with one aspect of the present invention, there is provided in a reproduction machine including a programmable controller for controlling reproduction functions of the machine, a user active interface unit connected to the controller. The active interface unit includes user actuatable means for selecting one of at least two modes of the machine for performing a desired reproduction function, and start means for starting the machine to perform the desired function according to the selected one of the at least two modes thereof. The active interface unit also includes a graphic display representing each of the at least two modes for performing the desired reproduction function, and means connected to the controller for animating the graphic display in response to a user actuating the means for selecting one of the at least two modes for performing the desired function.

In accordance with another aspect of the present invention, there is provided a method of copying pages of a book on a reproduction machine having a transparent platen, a scanner assembly, and a controller including selectable mode means for book copying. The method includes the steps of selecting a mode for copying a page of the book to be copied, and of automatically flashing a light source in response to selection of the copying mode and thereby animating a graphic display representing the page of the book to be copied. The method also includes the steps of positioning the page of the book to be copied on the transparent platen in registration with the scanning assembly, and of actuating a start switch to start scanning and copying of the page of the book on the platen.

Other features of the present invention will become apparent from the following drawings and description.

BRIEF DESCRIPTION OF THE DRAWINGS

For a better understanding of the present invention, reference may be had to the accompanying drawings wherein the same reference numerals have been applied to like parts, and wherein.

DESCRIPTION OF THE PREFERRED EMBODIMENT

While the present invention will hereinafter be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
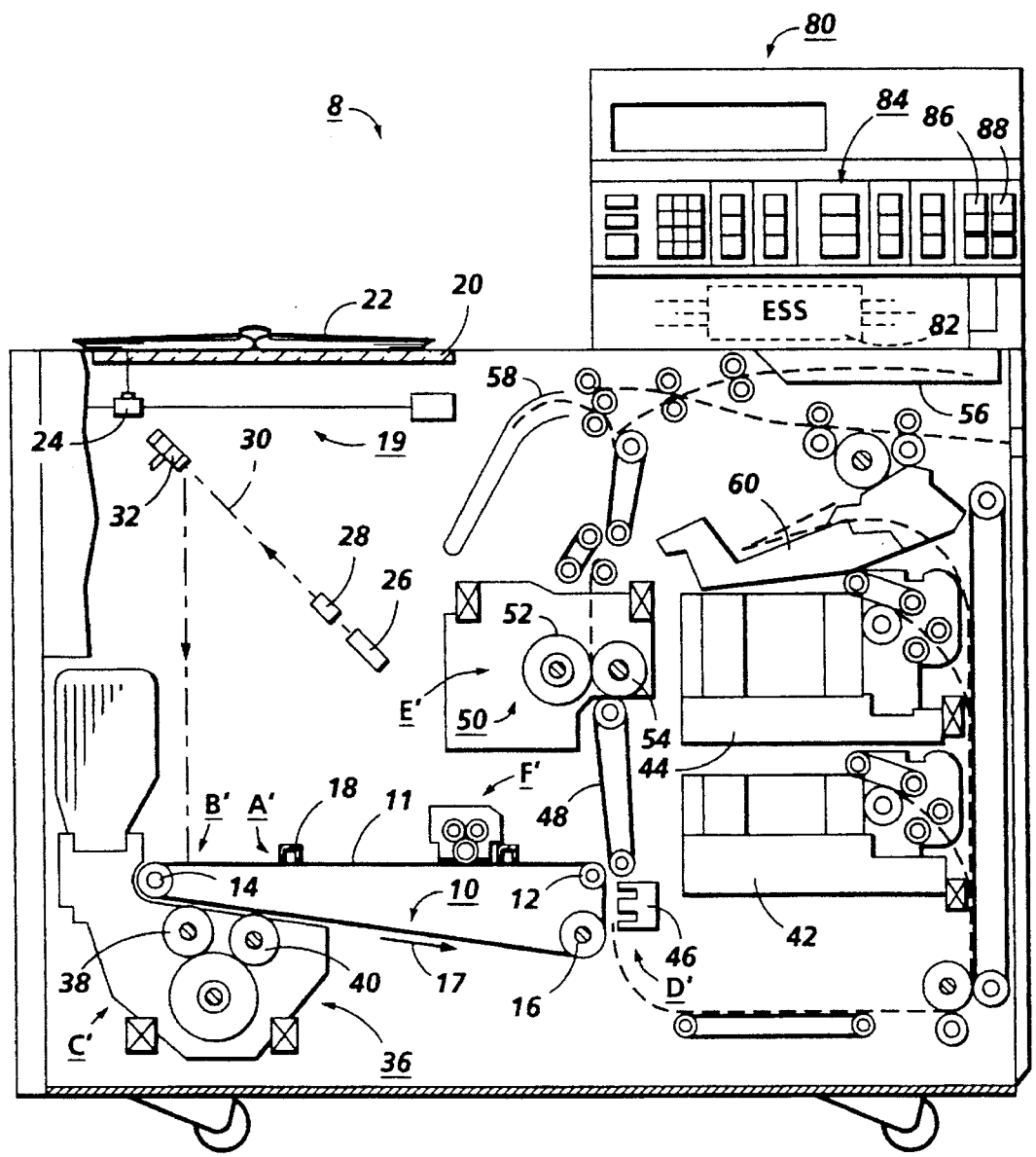
FIG. 1 is a schematic view illustrating the principal mechanical components of an exemplary printing machine incorporating the features of the present invention.

For a general understanding of the features of the present invention, reference is made to the drawings. In the drawings, like reference numerals have been used throughout to designate identical elements. FIG. 1 is a perspective view illustrating an electrostatographic printing machine incorporating the features of the present invention therein. It will become apparent from the following discussion that the apparatus of the present invention is equally well suited for use in a wide variety of printing machines and is not necessarily limited in its application to the particular embodiment shown herein.

Referring now to FIG. 1, there is shown an elevational view of an illustrative electrostatographic printing machine 8 incorporating the features of the present invention therein. As shown thereat, the printing machine 8 employs a belt 10 having a photoconductive surface 11 deposited on conductive substrate. Preferably, the photoconductive surface 11 is made from a charge generator layer having photoconductive particles randomly dispersed in an electrically insulting organic resin. The conductive substrate comprises a charge transport layer having a transparent, electrically inactive polycarbonate resin with one or more diamines dissolved therein. Belt 10 advances successive portions of the photoconductive surface sequentially through the various processing stations disposed about the path of movement thereof. Belt 10 is entrained about stripping roller 12, tensioning roller 14 and drive roller 16. Drive roller 16 is coupled to a suitable motor (not shown) so as to rotate and advance belt 10 in the direction of the arrow 17.

Initially, a portion of belt 10 passes through charging station A'. At charging station A', a corona generating device 18 charges the photoconductive surface of belt 10 to a relatively high, substantially uniform potential.

After the photoconductive surface of belt 10 is charged, the charged portion thereof is advanced through exposure station B' that includes an optical system shown generally as 19. At exposure station B', an original document such as a book 22, is positioned on a generally planar, substantially transparent platen 20 and imagewise exposed by the optical system 19. As is well known, an operator may in copying the book 22 desire to copy only one page at a time, or the two open pages at a time. As discussed above, such copying usually involves repositioning and reregistration of the book, particularly when copying many pages of the book. Operator confusion and errors that could result from such a long copying job are addressed by the features of the present invention (to be described below).

The optical system 19 can be a flash illumination system, or as shown, a scanning system that incorporates one or more linear arrays 24 (to be described in detail below) that are supported for reciprocating and scanning movement below platen 20. As shown, in addition to the linear array 24, the scanning system 19 includes a laser 26, the beam of which is split into two imaging beams 30. Each beam 30 is modulated in accordance with the content of an image signal input by an acousto-optic modulator 28 to provide dual imaging beams 30. Beams 30 are scanned across the moving photoreceptor 10 by the mirrored facets of a rotating polygon 32 in order to expose two image lines on photoreceptor 10, thus creating the latent electrostatic images represented by the image signal input to modulator 28. In a flash illumination system, flash lamps will flash light rays onto the document 22 on the platen 20. The light rays are then imagewise reflected onto the charged portion of the photoconductive surface of belt 10 to selectively dissipate the charge thereon, thus recording an electrostatic latent image on the photoconductive surface. After the electrostatic latent image is formed on the photoconductive surface, belt 10 advances the electrostatic latent image to development station C'.

At development station C', a magnetic brush development system for example, indicated generally by the reference numeral 36, advances developer material into contact with the electrostatic latent image on surface 11. Preferably, magnetic brush development system 36 includes two magnetic brush developer rollers 38 and 40. Each roller advances developer material into contact with the latent image. These rollers form a brush of carrier granules and toner particles extending outwardly therefrom. The latent image attracts the toner particles from the carrier granules forming a toner powder image on the photoconductive surface of belt 10.

After the electrostatic latent image is developed, belt 10 advances the toner powder image to transfer station D'. At transfer station D', successive sheets of support material are advanced from copy sheet trays 42 or 44. Transfer station D' includes a corona generating device 46 which sprays ions onto the backside of the copy sheet. This attracts the toner powder image from the photoconductive surface to the copy sheet. Thus, the toner powder image corresponding to the informational areas contained within one page of the book 22 are transferred to a first copy sheet and the toner powder image corresponding to the informational areas of the opposite page of book 22 are transferred to a second copy sheet. After transfer, the copy sheets move onto conveyor 48 which advances the sheets to fusing station E' while the surface 11 moves on and is cleaned by a cleaning station F'.

Fusing station E', includes a fuser assembly, indicated generally by the reference numeral 50, which permanently affixes the transfer powder image to the respective copy sheets. Preferably, fuser assembly 50 comprises a heated fuser roller 52 and back-up roller 82. The copy sheets pass between the fuser roller 52 and back-up roller 54. The copy sheets pass between the fuser roller and the back-up roller with the toner powder image contacting the fuser roller. In this manner, the toner powder images are permanently affixed to the respective copy sheets. After fusing, the copy sheets are advanced to output tray 56.

The foregoing describes a simplex copying operation. Alternatively, if it is desired to copy opposite pages of the book on the same copy sheets on opposite surfaces thereof, i.e. duplex copying, the first toner powder image is transferred to one side of the copy sheet at transfer station D'. The copy sheet advances through fusing station E' where the toner powder image is permanently affixed thereto. Thereafter, the copy sheets enters into inverter 58. From inverter 58 rollers advance the copy sheet to duplex tray 60. The copy sheet is then advanced from duplex tray 60 back to transfer station D' with the surface thereof not having the toner powder image thereon being positioned in contact with the next toner powder image on the photoconductive surface of belt 10 at transfer station D'. It should be noted that the machine will automatically skip the appropriate numbers of pitches in order to insure the opposite side of the copy sheet is advanced in a timed sequence with the toner powder image to transfer station D'. The copy sheet, with the toner powder image transferred to the opposite side thereof, once again passes through fusing station E' and the toner powder image corresponding to the other page of book 22 is permanently affixed thereto. The copy sheet then advances to output tray 56. In this duplex mode of operation, opposite pages of book 22 are copied onto opposite surfaces of the same copy sheet.

Referring still to FIG. 1, the printing machine 8 includes an operator control panel shown generally as 80. The control panel 80 includes the electronic subsystem (ESS) or controller 82 for all components and functions of the machine 8, including the component features thereof according to the present invention. The controller 82 for example includes a processor for converting and handling image data generated by the array 24 in a form required for carrying out a programmed job. The control panel 80 also includes control and feature selection buttons 84 for use by an operator to program a particular job, such as a book copying job. The buttons 84 for example include mode selection buttons for selecting whether to copy the open pages of a book one page at a time, or two pages at a time.

Figure 2:
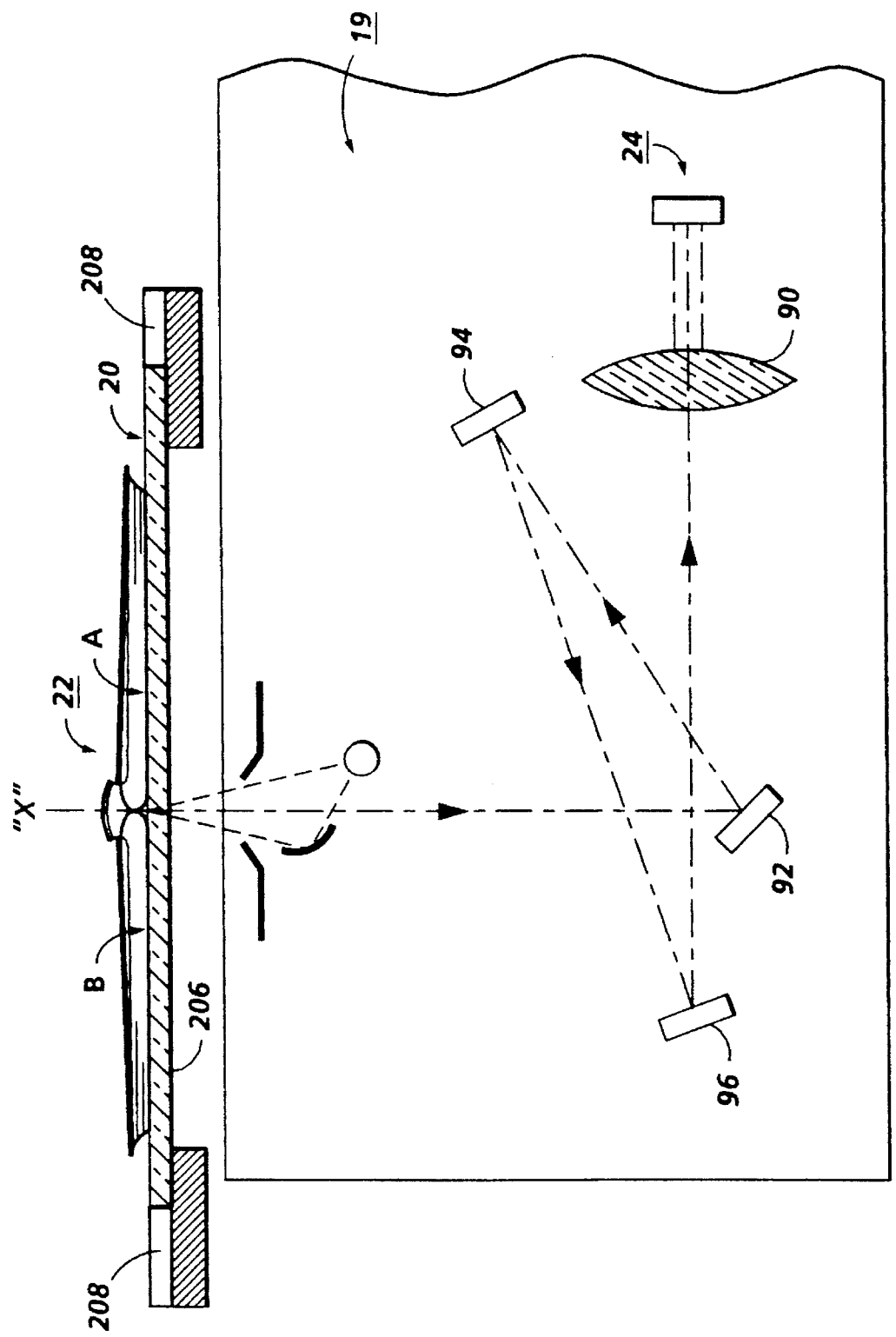
FIG. 2 is a schematic view showing certain construction details of the document scanning system of FIG. 1.
Figure 3:
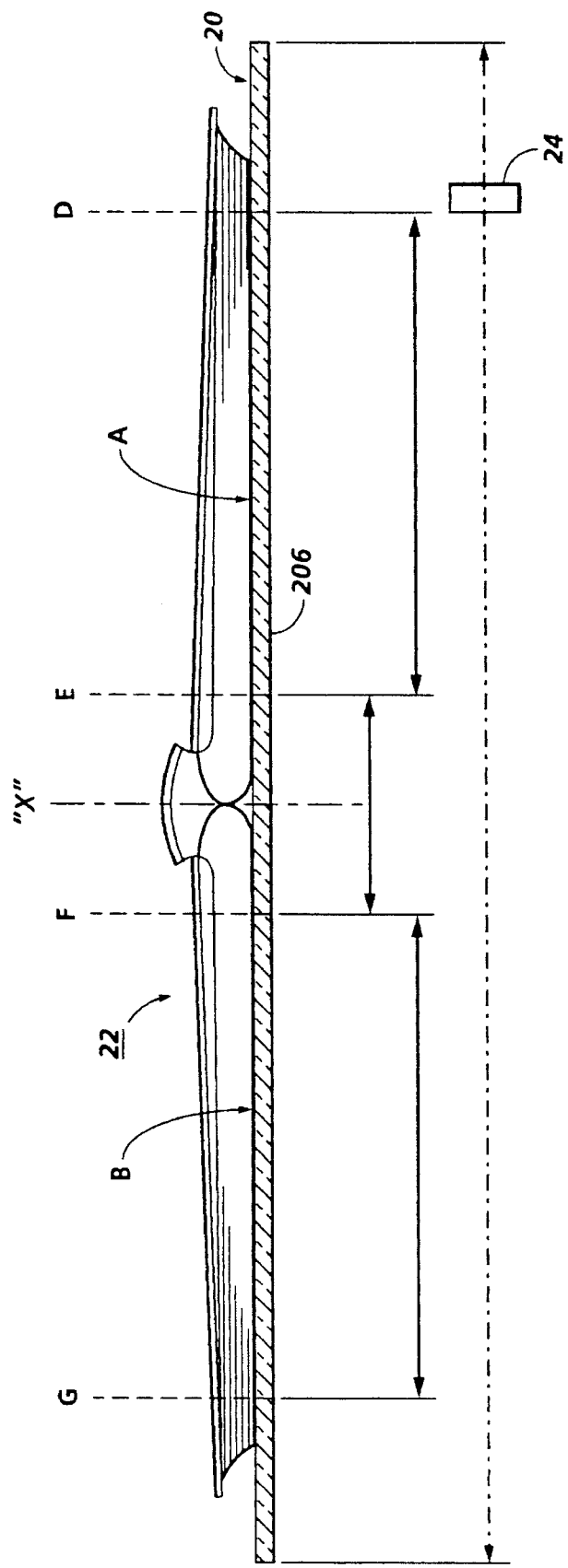
FIG. 3 is a schematic view of the imaging platen of FIG. 1 with an open book document placed thereon for scanning.
Figure 4:
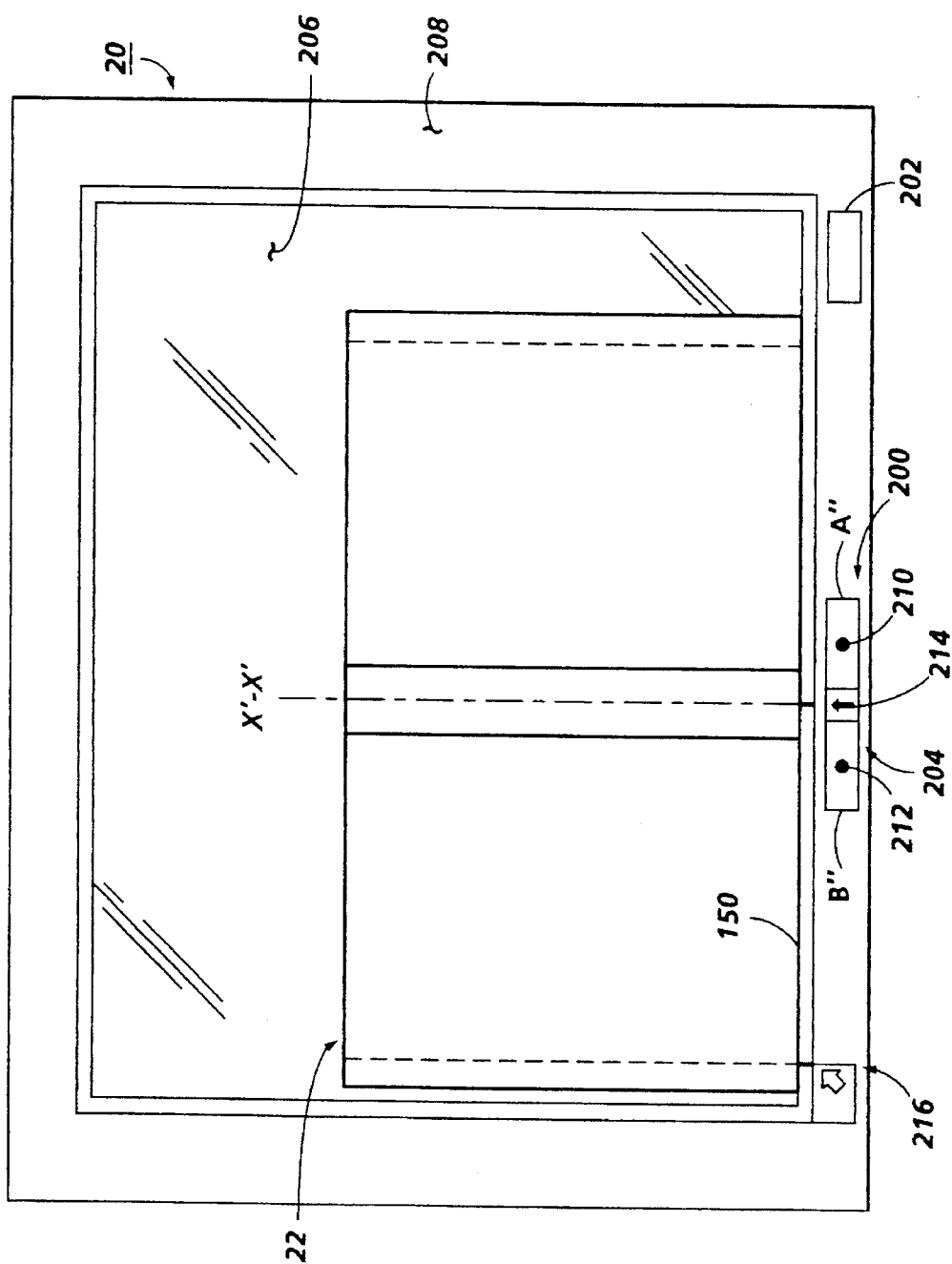
FIG. 4 is a plan view of the platen and document of FIG. 3 showing the active communication feature of the present invention.

Referring now to FIGS. 2–4, schematic and plan views of the platen 20 are illustrated, including the book type document 22 placed thereon for copying. As shown in detail in FIG. 2, the linear array 24 includes a lens 90 and mirrors 92, 94, 96 that cooperate to focus the array 24 on a line-like segment of platen 20, and hence of the document, book 22. Array 24 provides analog image signals or pixel information representative of the image on the pages of the book 22 being scanned. The document, book 22, as illustrated, has both an A, first imaging side, and a B, second imaging side, on two opposing pages thereof. More appropriately, document 22 may be any signature-type document having distinct images formed on a single surface thereof, in which the images may represent two opposing pages of a signature unit. Document 22, as such, may be scanned in one or both of two selectable modes, which are one side, or both sides, at a time modes. Document 22 is shown registered in the center of imaging platen 20, along center line X'–X', and along a book document registration edge 150 in accordance with the present invention.

In accordance with the present invention, after the user has programmed a book copying job, as above, including selecting a scanning mode therefor, the controller 82 awaits an indication that the book has been properly registered on the platen having the scanning range DEFG, with an optical axis "X" for the scanner 19. The affirmative response may come from one of two sources. First, in the case where the user is scanning a bound original document or book, the affirmative response is caused by the user depressing a Start Scan switch button 202 (FIG. 4). Subsequently, controller 82 determines if side A of book document 22 has been selected for imaging. If so, then capture by scanning system 19 of line-like segments or rasters of the document image of side A is begun, and the array 24 thereof continues capturing rasters as it moves from position D towards the position E.

Upon reaching position E, array 24 will have captured the image data from the area side A of book document 22 programmed by the user. Further image data capture is then disabled. Since image capture for side A has been completed, or if side A has not been selected, the array 24 then indexes to a location between positions E and F of FIG. 3. Next, the controller 82 determines if side B has been selected for imaging. If so, the array 24 moves to position F where it begins capturing raster information associated with side B and once again, image data is captured over the entire programmed area from position F through position G. Upon completing the image capture, the array 24 is indexed to a location beyond position G.

Subsequently, the controller 82 reverses the scanning direction of the array 24 and sets a flag bit in an image status message sent to controller 82 indicating that subsequent image rasters will be transmitted in reverse order. Then, the controller 82 awaits an indication that the job has been completed. As an example, the indication may come from the user selecting a Stop Scan button (not shown) which would cause the completion of the scanning job. Alternatively, the user may turn to a new page of the input document, re-register it and select Start Scan 202. Either of these two operations would provide an indication that the job has not been completed.

Once the controller has received an indication that the original document is properly registered, the controller 82 determines if the new page side B should be imaged. If so, the array 24 moves in a reverse, or left- to-right, direction back towards position G, where it again begins capturing image data in the reversed orientation. Upon completing the image capture operation at point F, or if the new page side B imaging is not selected, the array 24 then indexes to a location between positions F and E. Subsequently, the controller determines if the new page side A is to be scanned, and if so, the image capture operation is begun as the array 24 moves past position E. In a similar fashion, the image for new page side A is captured through position D, at which point the scan array is indexed to a home location beyond position D, under the right-most edge of platen 20. Upon returning to the home location, the scanning direction is again reversed and the image reversal flag bit is cleared. Subsequently, the controller 82 awaits a positive affirmation of the end of the scanning job and completion of the job.

Book copying as such includes varying the positioning and registration of the book 22 on the platen in order to prevent the production of book page copies with darkened edges. Often, it also involves reselection of the bookcopying mode from one-sided to two-sided copying or vice versa. Ordinarily, such reselection in turn requires repositioning and reregistration of open pages of the book being copied. When such a job is one to take a long period of time, operator confusion and copying errors are likely due for example to the operator forgetting a selected mode. The result can be a failure to produce desired copies, or the production of unwanted copies.

Referring now to FIGS. 2 to 6, the user active interface feature of the present invention is illustrated generally as 200, and is useful in preventing such operator confusion and errors. The active interface feature as shown includes the operator control panel 80 (FIG. 1) with the mode control buttons 86, 88 for selecting one of at least two modes of the machine for performing a desired reproduction function, such as a book copying function. The active interface feature 200 also includes start means such as the button 202 (FIG. 4) for starting the machine in performing the function according to the selected mode. The active interface feature 200 further includes a graphic display 204 representing each of the at least two modes for performing the desired reproduction function, and means connected to the controller 82 for animating the graphic display 204 in response to a user actuating a button 86, 88 for selecting one of the at least two modes of performing the desired function, in this case, a book copying function.

The means for performing a book copying function includes the transparent platen 20 for holding a book 22 being copied, and the optical scanning system 19 for scanning images of pages of the book. The platen 20 includes an image scanning portion 206, and a frame portion 208 that surrounds the image scanning portion 206. The optical scanning system 19, for example, includes a controlled side-to-side scanning range DEFG (FIG. 3), and the optical axis "X" located centrally within said left-to-right scanning range. As shown, the optical scanning system 19 is movable reciprocally relative to the book 22 being held on the platen 20 for copying, and may include a split scanning device for scanning first one-half G "X" of the scanning range, and then the other half "X" D. The selectable mode buttons 86, 88 of the controller 82 include a first mode for copying an open book one page at a time, and a second mode for copying an open book two pages at a time. The machine or system control means 82 for animating the graphic display 204 includes a visible light source 210, 212, such as an LED, and means including the controller 82 for creating a flashing effect from the light source. As shown, for a book copying function, the graphic display 204 comprises an open book icon having a first page portion A", and a second page portion B".

The first page portion A" and the second page portion B" of the open book icon 204 includes the light sources 210, 212, and means including the controller 82 for creating the flashing effect from the light sources. The graphic display 204 further includes an arrow icon 214 that is positioned centrally relative to the first and the second page portions A", B" of icon 204. As further shown, the graphic display, or book icon 204 is located on the frame portion 208 surrounding the image scanning portion 206 of the transparent platen 20. The center line X—X of the platen 20 runs between the first and second portions A", B" of the graphic display 204, and is aligned with the optical axis "X" (FIG. 5) of the scanning system 19.

The first 210 and the second 212 flashable light sources are located adjacent the first and the second portions A", B" of the graphic display, respectively, for selectively and actively flashing in response to a user selecting the mode selecting means, when performing a book copying function. The means for copying a book further includes an edge and corner registration mark 216 for registering a single page of a book to be copied in a single page book copying mode, and the center-registration mark (arrow) 214 for registering two pages of the book to be copied in a two-pages book copying mode. The first and the second portions A", B" of the graphic display 204 are located symmetrically about the center registration mark (arrow) 214.

According to another aspect of the present invention, there is provided a method of copying pages of a book 22 on a reproduction machine 10 having a transparent platen 20, a scanning system 19, and a controller 82 including selectable mode means 86, 88 for book copying. The method includes the steps of selecting a mode for copying a side or page A, B of the book 22. This mode selecting step includes selecting a mode for copying one or two pages at a time. The method includes automatically flashing a light source 210, 212 of an active interface feature 200 in response to selection of the copying mode, thereby animating a graphic display 204 representing the side or page A, B of the book to be copied. The method also includes the steps of positioning the page A, B of the book 22 to be copied on the transparent platen 20 in registration with the scanning system 19, and of actuating a start switch 202 to start scanning and copying of the page of the book on the platen.

The animating step includes animating one page portion A" of an open book icon 204 having a first page portion A" and a second page portion B" thereof. The positioning step includes positioning the page A, B of the book to be copied on the transparent platen 20 in accordance with an edge registration guide 150, 216. The start switch actuating step includes a step of automatically discontinuing the flashing of the light sources 210, 212 of the animating step, upon actuation of the start switch 202. The step of automatically discontinuing the flashing of the light sources, as such, is temporary, and preferably lasts only for the duration of the scanning and copying of the page or pages of the book on the platen. The positioning step includes positioning the two pages of the book to be copied on the transparent platen 20 in accordance with the center registration mark (arrow) 214 located on the surrounding portion 208 of the transparent platen.

As can be seen, there has been provided in a reproduction machine, a user interface including an active user interface feature having animated marking and communication means for guiding and directing a user or an operator through a book copying function so as to minimize confusion and errors that ordinarily would result from such a long function that involves variable user activities.

While a preferred embodiment of the present invention has been illustrated and described, it will be appreciated that numerous changes and modifications are likely to occur to those skilled in the art, and therefore the appended claims are intended to cover all those changes and modifications which fall within the true spirit and scope of the present invention.

What is claimed is:

1. A reproduction machine comprising:
   (a) performing means for performing a desired reproduction function according to a preselected mode, said performing means including means for performing a book coping function, and said means for performing a book copying function including a transparent platen;
   (b) a controller, including selectable mode means, connected to said performing means for controlling the performance of the desired reproduction function;
   (c) mode selecting means connected to said controller for selecting a mode of performing the desired reproduction function; and
   (d) a user interface feature, connected to said selectable means and to said controller, for actively directing user input activities to the desired reproduction function to be performed, said user interface feature including a graphic display located on a frame portion surrounding said transparent platen for representing a preselected mode of the desired function to be performed, and means connected to said controller for animating said graphic display in response to selection of said mode selecting means.

2. The reproduction machine of claim 1, wherein said means for performing a book copying function includes a transparent platen for holding a book being copied, and an optical scanner assembly for scanning images of the book being copied.

3. The reproduction machine of claim 1, wherein said selectable mode means of said controller comprises a mode for copying an open book one page at a time, and a mode for copying an open book two pages at a time.

4. The reproduction machine of claim 1, wherein said means for animating said graphic display includes a visible light source and means for creating a flashing effect from said light source.

5. The reproduction machine of claim 2, wherein said optical scanner assembly includes a controlled side-to-side scanning range, and an optical axis located centrally within said side-to-side scanning range.

6. The reproduction machine of claim 2, wherein said optical scanner assembly is movable reciprocally relative to a book being held on said platen for copying.

7. The reproduction machine of claim 2, wherein said optical scanner assembly comprises a split scanning device for scanning first one-half of a scanning range, then the other half.

8. The reproduction machine of claim 2, wherein said platen includes an image scanning portion and a frame portion surrounding said image scanning portion.

9. The reproduction machine of claim 4, wherein said graphic display comprises an open book icon having a first page portion and a second page portion.

10. The reproduction machine of claim 4, wherein said graphic display comprises a first portion and a second portion representing first and second pages of an open book, respectively.

11. The reproduction machine of claim 9, wherein each of said first page portion and said second page portion of said open book icon includes a light source and means for creating a flashing effect from said lightsource.

12. The reproduction machine of claim 9, wherein said graphic display includes an arrow icon positioned centrally relative to said first and said second page portions.

13. The reproduction machine of claim 10, wherein said means for animating each of said first and said second portions of said graphic display comprises a flashable LED.

14. The reproduction machine of claim 10, wherein a center line dividing said first and said second portions of said graphic display is aligned with an optical axis of said scanner assembly.

15. A reproduction machine comprising:
   (a) means, including a transparent platen and a scanner assembly, for copying pages of a book in accordance with preselected modes;
   (b) a controller for controlling functions and modes of the machine including a book copying function and modes thereof; and
   (c) a user interface, connected to said controller and to said copying means, for actively directing a user through said book copying function and modes, said user interface including:
      (i) mode selecting means for selecting a book copying mode;
      (ii) a graphic display located visibly on a surrounding portion of said transparent platen, said graphic display including a first portion and a second portion representing first and second pages respectively of an open book to be copied; and
      (iii) first and second flashable light sources located adjacent said first and said second portions of said graphic display, respectively, for selectively and actively flashing in response to a user selection of said mode selecting means, when performing a book copying function.

16. The reproduction machine of claim 15, wherein said means for copying a book includes an edge registration mark for registering a page to be copied in a single page book copying mode, and a center-registration mark for registering two pages to be copied in a two-pages book copying mode.

17. The reproduction machine of claim 16, wherein said first and said second portions of said graphic display are located symmetrically about said center-registration mark.

18. The reproduction machine of claim 16, wherein said graphic display includes a flashable arrow representing said center-registration mark.

19. A method of copying pages of a book on a reproduction machine having a transparent platen, a scanner assembly, and a controller including selectable book copying modes, the method comprising the steps of:
   (a) selecting a mode for copying a page of the book to be copied;
   (b) automatically animating a graphic display representing the page of the book to be copied by flashing a light source in response to selection of the copying mode;
   (c) positioning the page of the book to be copied on the transparent platen in registration with the scanning assembly; and
   (d) actuating a start switch to start scanning and copying of the page of the book on the platen, said step of actuating a start switch including a step of automatically discontinuing the flashing of the light source from said animating step said step of automatically discontinuing the flashing of the light source is temporary for the duration of the scanning and copying of the page of the book on the platen.

20. The method of claim 19, wherein said animating step comprises animating one page portion of an open book icon having a first page portion and a second page portion by flashing a light source associated with said one page portion thereof being animated.

21. The method of claim 19, wherein said positioning step comprises positioning the page of the book to be copied on the transparent platen in accordance with an edge registration guide.

22. The method of claim 19, wherein said mode selecting step comprises selecting a mode for copying two pages of the book to be copied.

23. The method of claim 23, wherein said animating step comprises automatically animating a graphic display having first and second portions representing the two pages of the book to be copied by flashing in response to the selection of the copying mode a first and a second light source associated respectively with said first and said second portions of said graphic display.

24. The method of claim 23 wherein said positioning step comprises positioning the two pages of the book to be copied on the transparent platen in accordance with a center-registration mark located on a surrounding portion of the transparent platen.

* * * * *